United States Patent
Fugel

(10) Patent No.: US 7,014,401 B2
(45) Date of Patent: Mar. 21, 2006

(54) APPARATUS FOR SECURING LOADED GOODS ON THE LOADING AREA OF A VEHICLE

(75) Inventor: Thomas Fugel, Engen (DE)

(73) Assignee: allsafe Jungfalk GmbH & Co.KG, Engen (DE)

( * ) Notice: Subject to any disclaimer, the term of this patent is extended or adjusted under 35 U.S.C. 154(b) by 72 days.

(21) Appl. No.: 10/737,600

(22) Filed: Dec. 16, 2003

(65) Prior Publication Data

US 2005/0129480 A1    Jun. 16, 2005

(51) Int. Cl.
    *B60P 7/15*    (2006.01)
(52) U.S. Cl. .................... 410/153; 410/130; 410/141; 410/150
(58) Field of Classification Search ............... 410/104, 410/105, 130–132, 141, 145–150, 153; 248/354.1, 248/354.3; 211/105.3
    See application file for complete search history.

(56) References Cited

U.S. PATENT DOCUMENTS

| | | | | |
|---|---|---|---|---|
| 1,665,439 A | * | 4/1928 | Brown | 410/153 |
| 2,901,987 A | * | 9/1959 | Campbell et al. | 410/145 |
| 3,570,412 A | * | 3/1971 | Holman, Jr. | 410/153 |
| 4,208,970 A | * | 6/1980 | Matyas | 410/153 |
| 5,104,269 A | * | 4/1992 | Hardison | 410/149 |
| 6,364,583 B1 | * | 4/2002 | Koller | 410/89 |
| 6,722,829 B1 | * | 4/2004 | Williams | 410/139 |
| 6,749,383 B1 | * | 6/2004 | Benedict et al. | 410/153 |

FOREIGN PATENT DOCUMENTS

| | | |
|---|---|---|
| DE | 90 06 685.5 | 10/1990 |
| DE | 44 12 067 | 3/1996 |
| DE | 200 16 200 | 1/2001 |
| DE | 201 01 838 | 8/2001 |
| DE | 101 45 416 | 3/2002 |

* cited by examiner

*Primary Examiner*—Stephen Gordon
(74) *Attorney, Agent, or Firm*—Bachman & LaPointe, P.C.

(57) ABSTRACT

An apparatus for securing loaded goods on the loading area of a vehicle or similar device in the form of a beam-like profile having at least one insertion profile (30) that is mounted at one end on the latter, a pivoting head (40) of grooved cross section and a latching pin (60) that is mounted such that it can move relative thereto are articulated on the insertion profile by an axle pin (42) as a connection member for countermembers on the loading area or on a box body associated therewith. The latching pin (60) projects out of the grooved cross section of the pivoting head (40) from the latching body (50) towards the ridge plate of the pivoting head (40), and the latching body (50) is passed through by the axle pin (42) of the pivoting head (40) and in addition is assigned an energy accumulator. In the vicinity of the latching pin (60), the latching body (50) is provided with an eye (58) as coupling element for an actuating or tension bar (70). The latter has a coupling end that is bent approximately radially to its bar axis (Z) as an insertion member for the eye (58) of the latching body (50), which coupling end is mounted in the eye (58) in a manner such that it can rotate.

15 Claims, 6 Drawing Sheets

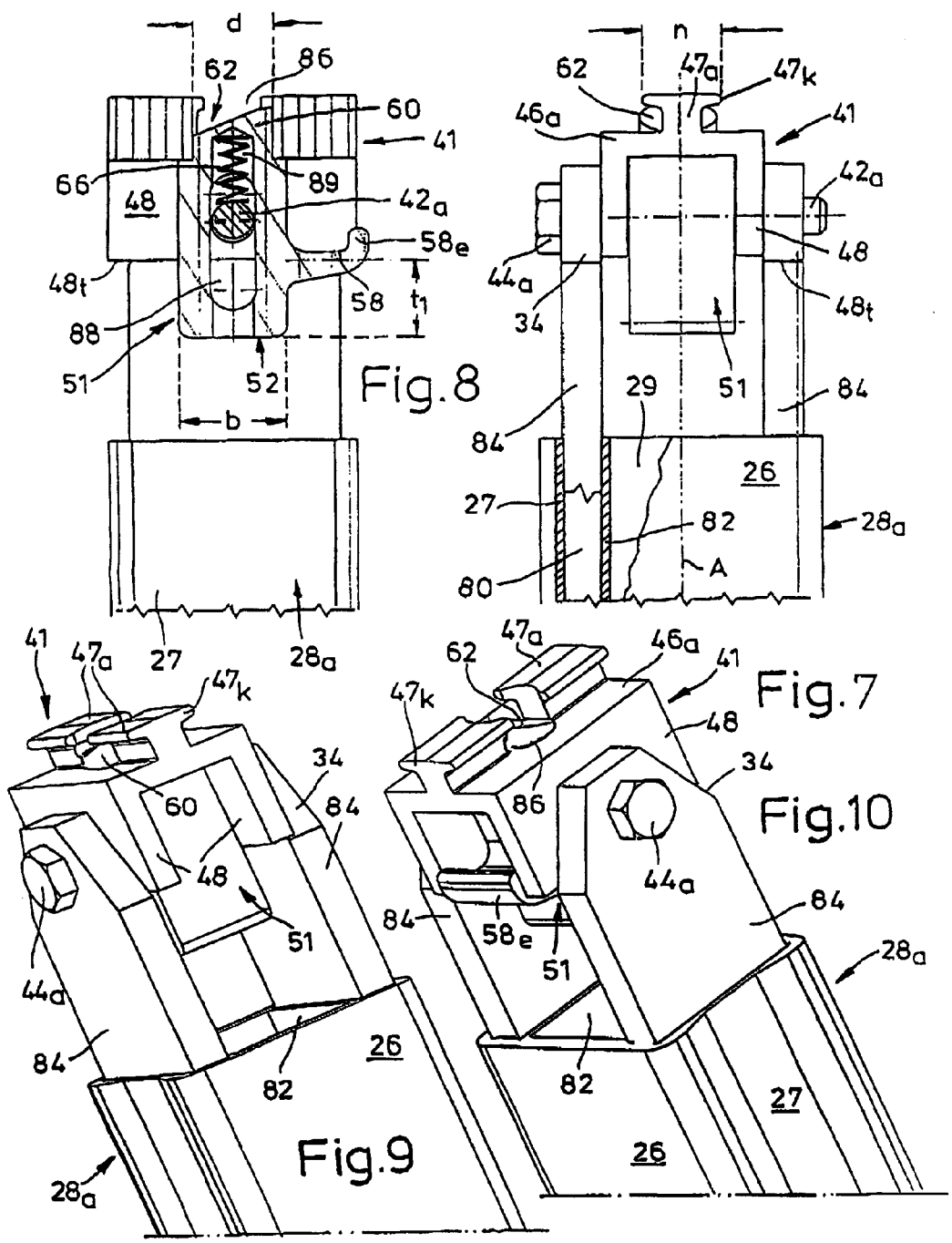

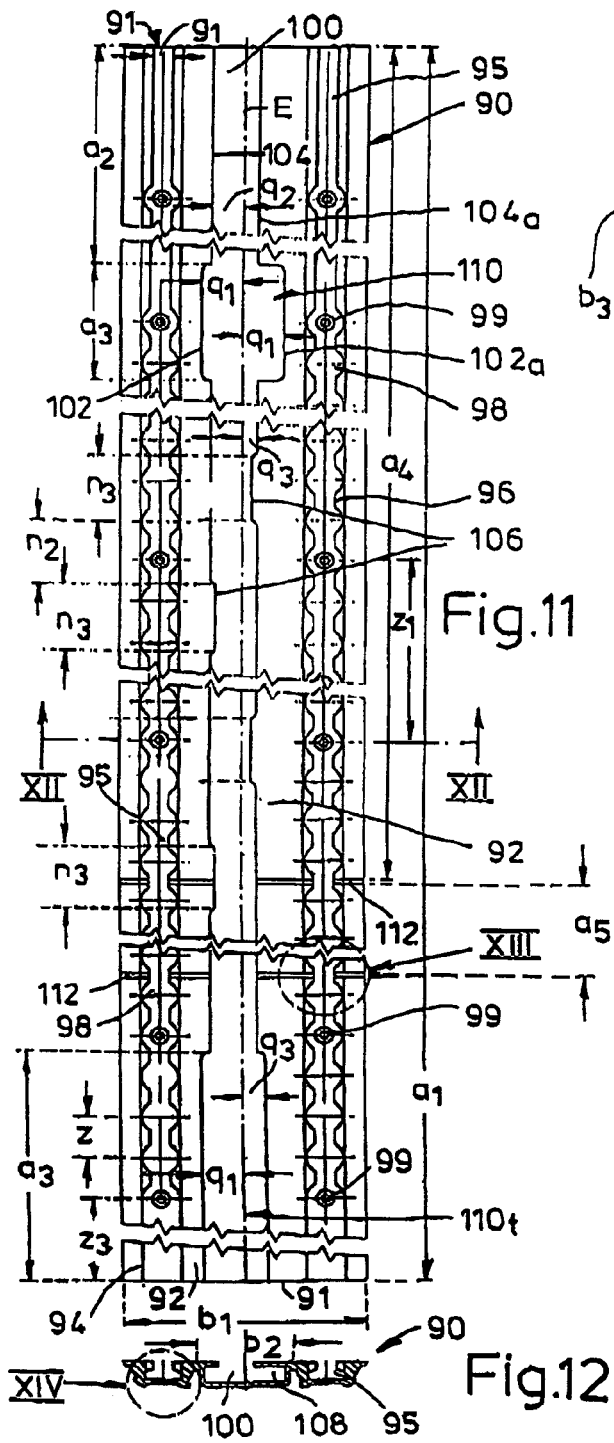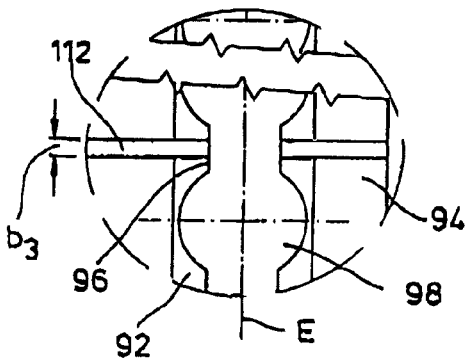

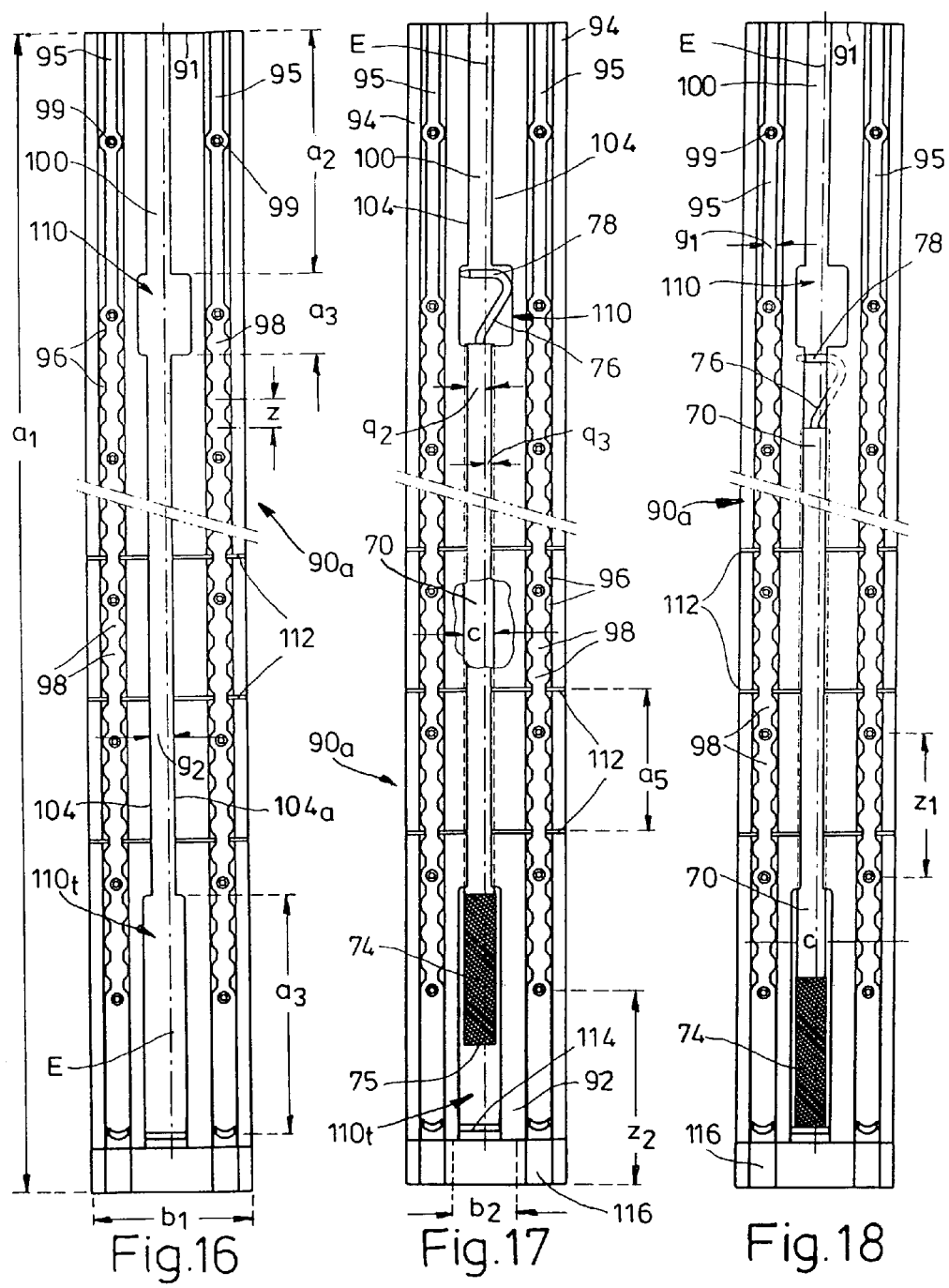

APPARATUS FOR SECURING LOADED GOODS ON THE LOADING AREA OF A VEHICLE

BACKGROUND OF THE INVENTION

The invention relates to an apparatus for securing loaded goods on the loading area of a vehicle or similar device in the form of a beam-like profile having at least one insertion profile that is mounted at one end on the latter, on which insertion profile a pivoting head of grooved cross section and a latching pin that is mounted such that it can move relative thereto are articulated by means of an axle pin as a connection member for countermembers on the loading area or on a box body assigned therewith.

Such an apparatus is disclosed in DE 201 01 838 U1 by the Applicant. The pivoting body of this apparatus is provided with an insertion element for a latching recess as countermember, which insertion element can move relative to the pivoting body, is designed as a latching body and is fixed to the pivoting body by means of a dedicated transverse pin. A free end of the latching body is connected to a lashing strap by means of a pin that passes through said latching body.

DE 44 12 067 C by the Applicant describes a pair of guide rails provided approximately horizontally on the side walls of the vehicle at a distance from the loading area, on which guide rails there are connected end connecting members of a carrier profile that runs between said rails in the operating position; at a distance from a profile end, this carrier profile is connected to a strand-like connecting bar by an articulation, and the connecting bar is mounted in a fixed position at the other end by means of a further articulation. This carrier profile can be swung out of an operating position and into a rest position about its articulation and the connecting bar can be swung out of an operating position and into a rest position about the further articulation, and they can also be attached to a guide rail by means of the end articulation.

In addition, there is also known a hollow profile that, by virtue of intermediate tubes that can be pushed on, can be extended telescopically, the hollow profile having hooks at both ends an being intended as a so-called intermediate wall closure, between whose one hook leg and the profile end face that is approximately adjacent and parallel thereto there can be pushed a guide rail which runs transversely to the resulting gap or a wall element of a truck. In order to generate a clamping force, said hook—articulated on a tension lever riveted to the bar profile—can be moved so as to vary the distance from the profile end face that forms a clamping mouth with the clamping leg.

With the knowledge of the prior art, the inventor set himself the aim of significantly improving both the adaptation of the apparatus described above to the conditions of the location of use and also the handling thereof.

SUMMARY OF THE INVENTION

All combinations of at least two of the features disclosed in the description, the drawing and/or the claims fall within the scope of the invention.

According to the invention, the latching pin projects out of the grooved cross section of the pivoting head from a latching body towards the ridge plate of the pivoting head, and the latching body—which is assigned an energy accumulator—is passed through by the axle pin of the pivoting head. In addition, the intention is to provide this latching body, in the vicinity of the latching pin, with an eye as coupling element for an actuating or tension bar according to the invention, which preferably has a coupling end that is bent approximately radially to its bar axis as an insertion member for the eye of the latching body; this coupling end is mounted in the eye in a manner such that it can rotate. The actuating bar allows particularly precise guidance of the pivoting head.

According to another feature of the invention, the bar axis is in alignment with the centre axis of the pivoting head, that is to say that said coupling end is divided by the bar axis into two sections of identical size, and the eye is made in the centre of the coupling end.

For the purpose of better handling, the tension bar at one end should have at least one handle.

It is within the context of the invention that the latching body at the other end comprises a rear section with a receiving groove for the energy accumulator held therein—which energy accumulator is designed as a leaf or torsion bar spring; this leaf or torsion bar spring is preferably curved in a U shape between the rear section of the latching body and the adjacent ridge plate of the pivoting head and endeavours to pull these two parts out of one another; as a result, the eye end of the latching body is pressed against the inner surface of the ridge plate of the pivoting head.

According to a further feature of the invention, the axle pin lies in a pair of parallel flank webs which adjoin flank walls of the insertion profile and should be made as one piece with the latter. These flank walls are provided on the inner side with in each case a longitudinal groove that is directed parallel to the profile axis, which longitudinal groove is preferably in each case delimited by a pair of internal ribs of the flank wall. In addition, at least one of the flank walls should be provided with a wall slit that is parallel to the axis.

Finally, protection is conferred on the fact that a comb profile having the shape of a T in cross section is integrally formed on the ridge plate of the pivoting head on the outside, the headliner of which comb profile is approximately in alignment with the ridge face of the latching pin in the rest position of the latter; this comb profile runs in cross section in the longitudinal axis of the insertion profile.

In a refinement of the pivoting head according to the invention, the comb profile projects from a planar surface of the ridge plate of the pivoting head—said surface crossing the longitudinal axis of the insertion profile; the width of the planar surface advantageously approximately corresponds to the width of the headliner. This upper surface, at a distance from the comb profile, in cross section should change on both sides into a batten shape that projects therefrom in a stepped manner, the surface of which batten shape in turn runs at an axial distance approximately parallel to the surface of the ridge plate. It has proven to be advantageous for the batten shape to project laterally beyond the outer surface of the adjacent leg wall of the pivoting head.

In another arrangement of the comb profile, the latter runs between two surfaces of the ridge plate of the pivoting head, which surfaces are curved upwards in cross section; this surface is determined by a contour on the ridge plate that is shaped like a segment of a circle in cross section. This curved surface on both sides of the longitudinal axis of the insertion profile forms in each case a projecting longitudinal ridge with the two outer surfaces of the leg walls of the pivoting head; the cross section or the contour of the surface is determined by a circular contour the radius of which corresponds approximately to the width of the pivoting head or approximately to twice the width of the headliner of said comb profile.

BRIEF DESCRIPTION OF THE DRAWINGS

Further advantages, features and details of the invention emerge from the following description of preferred examples of embodiment and with reference to the drawing. In the drawing:

FIG. 5 shows the plan view of FIGS. 2 and 3.

FIG. 6 shows an enlarged and partially cut-away detail from FIG. 2.

FIG. 7 shows a view that approximately corresponds to that of FIGS. 3 and 4—partially cut away—of a further arrangement of the main beam.

FIG. 8 shows the partially cut-away side view of FIG. 7.

FIGS. 9 and 10 show oblique views of the pivoting head of the main beam of FIGS. 7 and 8.

FIGS. 11 and 16 show the plan view of a partially depicted two-storey profile.

FIG. 12 shows the cross section through FIG. 11 on line XII—XII.

FIGS. 13 and 14 show enlarged details from FIG. 11 according to fields XIII and XIV therein.

FIG. 15 shows an enlarged part of FIG. 12.

FIGS. 17 and 18 show the two-storey profile of FIG. 16 with different positions of an inserted unlatching bar.

DETAILED DESCRIPTION

Figure 1:
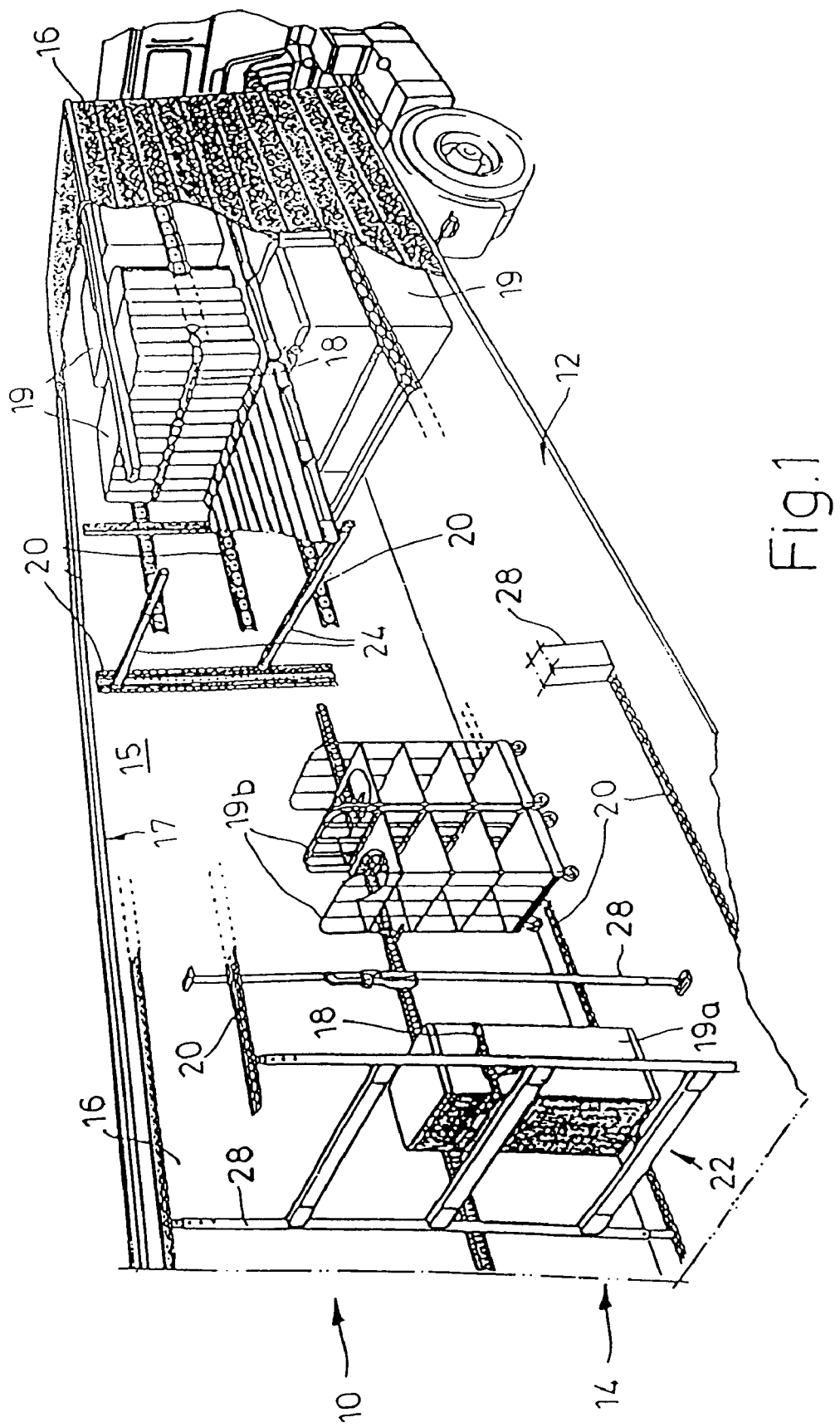
FIG. 1 shows an oblique view of part of a loading area of a vehicle having a box body and also, therein, parts assigned to rails of a load securing system.

Behind the driver's cab of a vehicle 10 that is shown only in part, there is a loading area 12 with a box body 14. On the loading area 12 and the inner surfaces 15 of the side walls 16—possibly also on the inner surface of the roof—of the box body 14, there are attached, horizontally and/or vertically, rail profiles as anchor rails 20 for the fixing of loaded goods, for example of crates 19, boxes $19_a$ or trolleys $19_b$—retained by means of lashing straps 18. To secure the load, ladder-type frames 22 having polygonal or round vertical profiles 28 in cross section may also be connected to the anchor rails 20. At 24, horizontal main beams are shown which are connected at both ends to vertical rail profiles 20.

Figure 2:
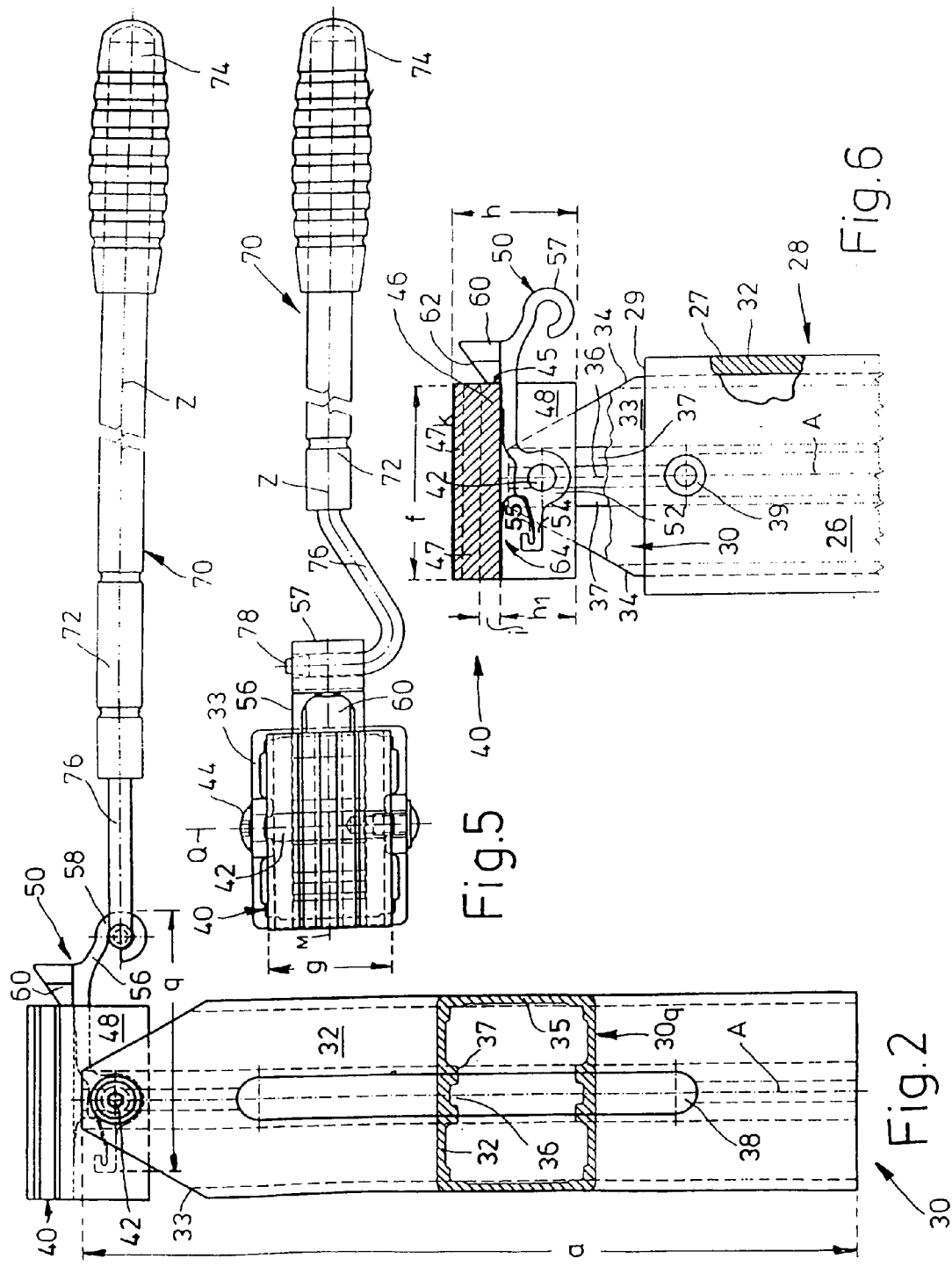
FIGS. 2 and 3 show a side and front view of parts of a main beam to be installed vertically, with a pivoting head in the rest position.
Figure 3:
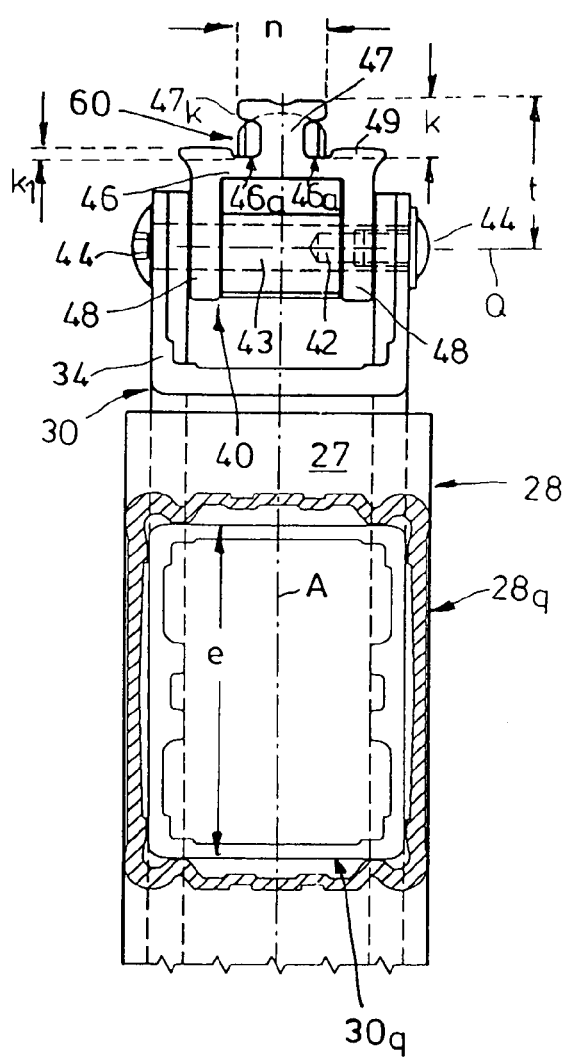
Figure 4:
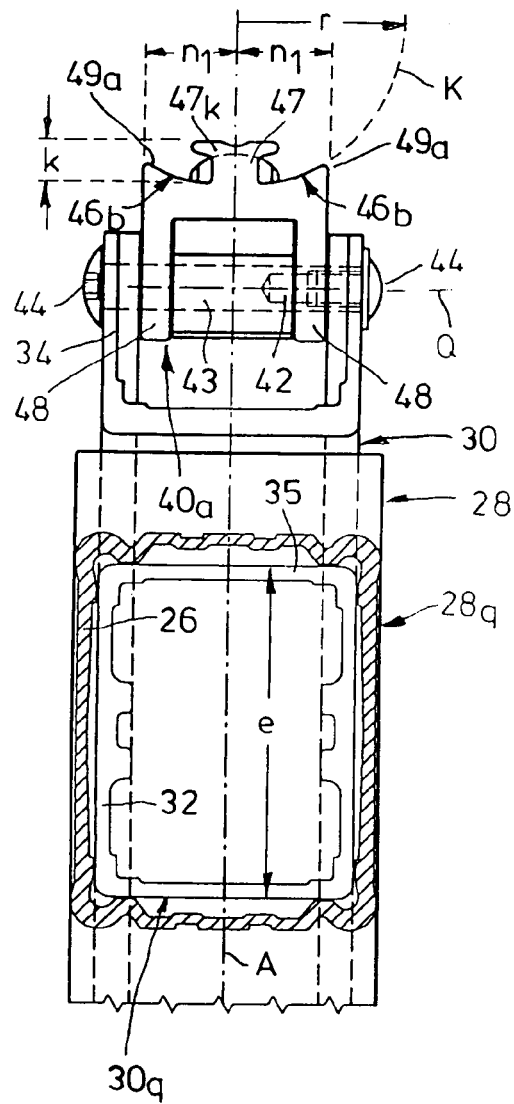
FIG. 4 shows a different arrangement of the main beam of FIG. 3.

The vertical profile 28 shown in FIGS. 3, 4 and 6, the rectangular cross section of which is shown at $28_q$ in FIGS. 3 and 4, is used for example as a retaining beam for forming a supporting wall for cases that are to be transported in a box body 14. Into its end opening 29—delimited by two flank walls 26 and two side walls 27—there is pushed an insertion profile 30 having a length a of in this case 280 mm with a rectangular cross section comprising two flank walls 32 of cross-sectional length e of 75 mm and end walls 35 connecting the latter; the cross section thereof is shown in FIG. 2 at $30_q$. On the inside of the flank walls 32 there are integrally formed two internal ribs 37, which delimit a longitudinal groove 36. In addition, a wall slit 38 runs parallel to the profile longitudinal axis A. At the top, said wall slit ends approximately at the transition of the flank wall 32 to a gusset-like flank web 33, the side edge of which is designated 34 for the sake of clarity.

Between the two parallel flank webs 33, a pivoting head 40 is mounted such that it can rotate by means of a unit—passing through said pivoting head and the flank webs 33—comprising an axle pin 42 and a coaxial screw bushing 43 that receives the latter, having two end pin heads or plate heads 44. This pivoting head 40, having a length f of 73 mm, a width g of 39 mm and a height h of 34 mm, is designed in a groove-like manner with two leg walls 48 running from a ridge plate 46 and having a clearance height $h_1$ of 27 mm. On the ridge plate 46, which has a thickness i of in this case 6.7 mm, there is integrally formed in the longitudinal axis A a comb profile 47 having the shape of a T in cross section and having a head width n of 19.5 mm of its headliner $47_k$—which headliner crosses said longitudinal axis A—as can be seen in particular in FIGS. 3 and 4. The distance t between the ridge surface of the headliner $47_k$ and the longitudinal axis Q of the axle pin 42 is 32.2 mm.

In the example of embodiment shown in FIG. 3, the T-shaped comb profile 47 having a height k of 12.5 mm is formed out of the surface $46_a$ of the ridge plate 46 that on both sides adjoins said comb profile as a planar surface—running transverse to the longitudinal axis A. The width of said surface $46_a$ corresponds approximately to the above-mentioned head width n of the headliner $47_k$, since it changes on both sides into batten shapes 49 of small height $k_1$ which project therefrom. Each of the batten shapes 49 which has a planar surface projects laterally beyond the outer surface of the leg wall 48 assigned thereto, forming a lateral ridge.

In the pivoting head $40_a$ shown in FIG. 4, there can be seen a comb profile 47 that is of a small height k compared to that seen in FIG. 3. From the base of this comb profile 47, there run on both side surfaces $46_b$ of the ridge plate 46 that are bent upwards and have the shape of a segment of a circle in cross section. Each of these surfaces $46_b$ produces, with the outer surface of the leg wall 48 assigned thereto, at a lateral distance $n_1$ from the longitudinal axis A, a longitudinal ridge $49_a$ that points upwards. Said surfaces $46_b$ determine a circular contour K the radius r of which approximately corresponds to twice its distance $n_1$.

A latching body 50 having a length q of 97 mm is mounted pivotably between the leg walls 48, on said axle pin 42; from a tubular bearing section 52—which is passed through by the axle pin 42—there projects firstly—within the pivoting head 40—a rear section 54 that is groove-like in longitudinal section and has a receiving groove 55 that runs approximately parallel to the ridge plate 46 and serves to receive the end of a torsion bar spring 64 shown at 64 and also, on the other hand, a front arm 56 which outside the pivoting head 40 is both curved to form a hook-like end eye 57—which is open towards the bottom—and is fitted towards the top with an integrally formed latching pin 60 having a round contour. The latter has a ridge face 62 that is inclined downwards relative to the pivoting head 40 and in the stop position shown in FIG. 5 is in contact with a transverse edge 45 of the ridge plate 46; in this stop position, the flat torsion bar spring 64—which is U-shaped in longitudinal section and is mounted on the inner surface of the ridge plate 46—presses the front arm 56 against the ridge plate 46.

It is not shown that the latching pin 60 in the stop position interacts in a latching manner with a vehicle-side rail profile 20—which guides the comb profile 47—for example engages in a bore of a so-called airline profile or AJ system profile.

The latching body 50 is guided against the force of said leaf or torsion bar spring 64 by a tension bar 70 which as shown in FIGS. 2 and 4 consists of a hollow profile 72 with a handle end 74 at one end and a hook profile 76 at the other end. This is bent out of the bar axis Z—which is in alignment with the centre axis M of the pivoting head 40—and has an insertion section 78 which crosses said bar axis Z and is inserted into said end eye 57 of the latching body 50. By virtue of the form-fitting connection between latching body 50 and tension or unlatching bar 70, the fixed seating of the latter in said latching body 50 is ensured and thus slipping is avoided.

The vertical profile $28_a$ of FIGS. 7 to 10 has on the inside of its two end walls 27 in each case a push-on track 80 which is delimited by a transverse wall 82 integrally formed on the flank walls 26. In each of these insertion tracks 80 there is seated a profile web 84 that fills the cross section thereof and—by virtue of inclined side edges 34—tapers towards the end and in this region is passed through by an axle pin $42_a$. The latter serves for the mounting of the pivoting head 41 which in this case is of a U shape in cross section, the leg walls 48 of which pivoting head are passed through by said axle pin.

From the planar ridge plate $46_a$ of the pivoting head 41, there projects in the profile axis A a comb profile $47_a$ as described above, which comprises a headliner $47_k$ and in this case is divided in the longitudinal centre into two sections by a bore 86. This bore 86 also passes through the ridge plate $46_a$. The diameter of the bore corresponds—with play—to the diameter d of a latching pin 60 guided into the bore 86, which latching pin 60 is part of an in this case linear latching body 51 as shown in FIG. 8. Said latching body 51 comprises an axial longitudinal slit 88 into which the axle pin $42_a$ slides; between the latter and a bore-like upper slit space $89_a$ of the longitudinal slit there is tensioned a helical spring 66. This latching body 51—which can be raised by the tension of the helical spring 66 or can be lowered against the latter—on a front surface at a central distance $t_1$ from its lower surface 52 having the width b, has integrally formed on it a hook 58 that bends away therefrom and has a hook end $58_e$ directed towards the end. In the deep position of the latching pin 60 shown in FIG. 8, the hook 58 runs approximately alongside the lower edges $48_t$ of the leg walls 48.

The unlatching bar 70 described above, when not in use, is mounted in a two-storey profile 90, which is shown by way of example in FIGS. 11 and 12 with a length $a_1$ of approximately 1600 mm, a width $b_1$ of approximately 150 mm and a thickness $c_1$ of approximately 20 mm. The cross section is composed of a central strip 92 having a width $b_2$ of approximately 28 mm and two flanking, integrally formed edge strips 94, which latter are provided in the manner of so-called airline profiles with in each case an undercut longitudinal groove 95; in the latter there are arranged, axially and at a central distance z from one another, bores 98 the diameter $d_1$ of which is greater than the width $g_1$ of the longitudinal groove 95; as a result there are formed, between the bores 98, edge sections 96 of the longitudinal groove 95 beneath which there run undercut regions 97. At regular axial central distances $z_1$ of approximately 200 mm, in the centre of bores 98 there are provided screwholes 99, where the pair of screwholes 99 adjacent to the transverse edges 91 of the two-storey profile 90 lies at a distance $z_3$ therefrom of approximately 130 mm.

In the central strip 92, there can likewise be seen an undercut longitudinal groove 100, the side walls 102 of which run at equal distances $q_1$ of 22.5 mm from the profile longitudinal axis E, but the longitudinal edges 104, $104_a$ of which in some sections are at different distances from the profile longitudinal axis E—forming undercut spaces 108; the longitudinal edge 104 shown on the left in FIG. 11 is for example in the upper region of the two-storey profile 90 at a distance $q_2$ of approximately 15 mm from the profile longitudinal axis E, and the longitudinal edge $104_a$ on the right is at a distance $q_3$ of approximately 10 mm.

At a distance $a_2$ of 210 mm from the upper transverse edge 91, the longitudinal groove 100 expands in the region of a window 110 having an axial length $a_3$ of 70 mm to the side walls 102 of the longitudinal groove 100 which, as has already been stated—run at a distance $q_1$ of 22.5 mm from the profile axis E. The undercut spaces 108 of varying width on the other hand connect again at this window 110. In the vicinity of the lower transverse edge 91 in FIG. 11, there can be seen another window $110_t$ having a length $a_3$, which in this case practically corresponds to the abovementioned distance $a_2$. The window $110_t$ is delimited on the one hand by a side wall 102 of the longitudinal groove 100 and on the other hand by a longitudinal edge section the distance $q_3$ of which from the profile axis E is in this case 13 mm.

Between the two windows 110, $110_t$, there are arranged, at both longitudinal edges 104, $104_a$ at axial distances $n_2$ of 40 mm from one another, in an alternating manner, narrow edge ribs 106 having an axial length $n_3$ of 40 mm, which project towards the profile axis E in the manner of a groove.

Into this longitudinal groove 100—as shown in FIGS. 17 and 18 in relation to another two-storey profile $90_a$—there is inserted an unlatching or tension bar 70 which is retained inter alia by said edge ribs 106.

Reference 112 designates transverse grooves having a small width $b_2$ (3 mm), the upper one of which in FIG. 11 runs at a distance $a_4$ of approximately 1800 mm from the upper transverse edge 91 and which are arranged at regular distances $a_5$ of 125 mm.

In the two-storey profile $90_a$ shown in FIGS. 16 to 18, there are no edge ribs 106; the width $g_2$ of the longitudinal groove 100—which runs eccentrically with respect to the profile axis E—is in this case—apart from the windows 110, $110_t$—constant and shorter than the thickness c of the tension bar 70, which is pushed into the undercut space 108 and held therein; in the latching position shown in FIG. 18, the hook profile 76 is situated below the upper window 110, and the end face 75 of the handle end 74 is seated on an inner bearing plate 114 of the two-storey profile $90_a$, which is closed beneath this by a base plate 116.

The invention claimed is:

1. Apparatus for securing loaded goods on a loading area of a device in the form of a beam-like profile having at least one insertion profile that is mounted at one end on the beam-like profile, on which insertion profile a pivoting head of grooved cross section and a latching pin is mounted such that the head can move relative to the insertion profile and is articulated by means of an axle pin, said insertion profile serves as a connection member for countermembers on the loading area or on a box body associated with the loading area wherein the latching pin projects out of the grooved cross section of the pivoting head from a latching body towards a ridge plate of the pivoting head, and the latching body is passed through by the axle pin and is assigned an energy accumulator.

2. Apparatus according to claim 1, characterized in that the latching body is provided, in the vicinity of the latching pin, with an eye as a coupling element for an actuating or tension bar.

3. Apparatus according to claim 2, characterized in that the tension bar has a coupling end that is bent approximately radially to a bar axis (Z) as an insertion member for the eye of the latching body, which coupling end is mounted in the eye in a manner such that it can rotate, the bar axis (Z) being approximately in alignment with a center axis (M) of the pivoting head.

4. Apparatus according to claim 2 or 3, characterized in that the tension bar at one end comprises at least one handle.

5. Apparatus according to claim 4, characterized in that the latching body at an end comprises a rear section with a receiving groove for holding the energy accumulator therein, which energy accumulator is designed as a leaf or torsion bar spring, the leaf or torsion bar spring being curved in a U shape between the rear section of the latching body and the ridge plate of the pivoting head.

6. Apparatus according to claim 1, characterized in that the axle pin lies in a pair of parallel flank webs which adjoin flank walls of the insertion profile, the flank walls being provided on the inner side with in each case a longitudinal groove that is directed parallel to a profile axis (A).

7. Apparatus according to claim 6, characterized in that the longitudinal groove is assigned a pair of internal ribs on the respective flank walls, said internal ribs delimiting the respective longitudinal groove, wherein the flank walls have a wall slit that is parallel to the axis.

8. Apparatus according to claim 1, characterized in that a comb profile having the shape of a T in cross section is integrally formed on the ridge plate of the pivoting head, a headliner of the comb profile is approximately in alignment with a ridge face of the latching pin in a rest position of the latter.

9. Apparatus according to claim 8, characterized in that the comb profile projects from a planar surface of the ridge plate of the pivoting head a width of the planar surface approximately corresponding to a width (n) of the headliner.

10. Apparatus according to claim 9, characterized in that the planar surface, at a distance from the comb profile, in cross section has a batten shape, a surface of the batten shape running at an axial distance ($k_1$) approximately parallel to the planar surface of the ridge plate.

11. Apparatus according to claim 10, characterized in that the batten shape projects laterally beyond an outer surface of an adjacent leg wall of the pivoting head.

12. Apparatus according to claim 8, characterized in that the comb profile projects from a surface of the ridge plate of the pivoting head (FIG. 4), which surface is curved upwards in cross section, there being provided a contour of the surface of the ridge plate that is shaped like a segment of a circle in cross section.

13. Apparatus according to claim 12, characterized in that the curved surface of the ridge plate on both sides of a longitudinal axis (A) of the insertion profile forms in each case a projecting longitudinal ridge with two outer surfaces of leg walls of the pivoting head.

14. Apparatus according to claim 13, characterized by a circular contour (K) that determines the cross section or the contour of the surface, the radius (r) of which circular contour (K) corresponds approximately to a width of the pivoting head.

15. Apparatus according to claim 13, characterized by a circular contour (K) that determines the cross section or the contour of the surface, the radius (r) of which circular contour (K) corresponds approximately to twice a width ($n_1$) of a headliner of the comb profile.

* * * * *